United States Patent
Bae et al.

(10) Patent No.: US 10,007,153 B2
(45) Date of Patent: Jun. 26, 2018

(54) LIQUID CRYSTAL DISPLAY AND METHOD FOR FABRICATING THE SAME

(71) Applicant: Samsung Display Co. Ltd., Yongin, Gyeonggi-Do (KR)

(72) Inventors: Kwang Soo Bae, Yongin-si (KR); Sang Il Park, Suwon-si (KR); Sung Hwan Won, Suwon-si (KR); Woo Jae Lee, Yongin-si (KR); Tae Woo Lim, Hwaseong-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 245 days.

(21) Appl. No.: 14/508,834

(22) Filed: Oct. 7, 2014

(65) Prior Publication Data

US 2016/0004108 A1    Jan. 7, 2016

(30) Foreign Application Priority Data

Jul. 1, 2014 (KR) ........................ 10-2014-0081865

(51) Int. Cl.
*G02F 1/1337* (2006.01)
*G02F 1/1333* (2006.01)
*G02F 1/1339* (2006.01)
*G02F 1/1341* (2006.01)

(52) U.S. Cl.
CPC .... *G02F 1/13394* (2013.01); *G02F 1/133377* (2013.01); *G02F 1/1337* (2013.01); *G02F 1/1341* (2013.01)

(58) Field of Classification Search
CPC combination set(s) only.
See application file for complete search history.

(56) References Cited

U.S. PATENT DOCUMENTS

| 6,067,141 | A | * | 5/2000 | Yamada | G02F 1/133753 349/129 |
| 2006/0209246 | A1 | * | 9/2006 | Kim | G02F 1/133377 349/155 |
| 2013/0293799 | A1 | * | 11/2013 | Lee | G02F 1/13394 349/42 |
| 2014/0152948 | A1 | * | 6/2014 | Chae | G02F 1/133345 349/110 |

FOREIGN PATENT DOCUMENTS

| KR | 10-2003-0040811 | 5/2003 |
| KR | 10-2004-0110834 | 12/2004 |
| KR | 10-2012-0014789 | 2/2012 |
| KR | 10-2012-0046845 | 5/2012 |
| KR | 10-2012-0087675 | 8/2012 |
| KR | 10-2013-0129008 | 11/2013 |
| KR | 10-2013-0134153 | 12/2013 |

* cited by examiner

*Primary Examiner* — Wen-Ying P Chen
(74) *Attorney, Agent, or Firm* — Innovation Counsel, LLP

(57) ABSTRACT

Provided are a liquid crystal display and a method for fabricating the same.
The liquid crystal display comprises a substrate having a plurality of pixel areas; a first electrode formed on the substrate in the unit of a pixel area; a fine space layer positioned on the first electrode; a partition formed between the adjacent fine space layers to partition the plurality of pixel areas; a roof layer formed on the fine space layer and the partition to define the fine space layer between the substrate and the partition; and a second electrode formed on a bottom surface of the roof layer, wherein the second electrode comes in contact with an upper surface of the partition.

20 Claims, 14 Drawing Sheets

LIQUID CRYSTAL DISPLAY AND METHOD FOR FABRICATING THE SAME

CROSS-REFERENCE TO RELATED APPLICATIONS

This application is based on and claims priority to Korean Patent Application No. 10-2014-0081865, filed on Jul. 1, 2014 in the Korean Intellectual Property Office, the disclosure of which is incorporated herein in its entirety by reference.

BACKGROUND

1. Field

The inventive concept relates to a liquid crystal display and a method for fabricating the same.

2. Description of the Prior Art

A liquid crystal display, which is one of display devices that have widely been used, is a display device that can adjust the quantity of penetrating light by applying a voltage to two opposite electrodes (a pixel electrode and a common electrode) and controlling an arrangement of liquid crystal molecules of a liquid crystal layer interposed between the two electrodes.

Typically, a liquid crystal display has been fabricated to include two substrates and a liquid crystal layer between the two substrates. Recently, however, in order to simplify the fabricating process thereof, the liquid crystal display has also been fabricated to include one substrate and a liquid crystal layer.

As an example, the liquid crystal display has been fabricated in a manner that a sacrificial layer is formed on one substrate in an area corresponding to a pixel area, a roof layer is formed on the sacrificial layer, the sacrificial layer is removed, and then a liquid crystal layer is formed by injecting liquid crystal molecules into a fine space layer that is formed through removal of the sacrificial layer.

SUMMARY

The sacrificial layer is typically formed by patterning a positive photosensitive layer. Specifically, the sacrificial layer may be formed by depositing the positive photosensitive layer on a substrate and exposing and developing the positive photosensitive layer using an exposure mask. In this case, the exposed area of the positive photosensitive layer is a surrounding area of the pixel area, and is removed through exposing and developing processes.

While the positive photosensitive layer is exposed using an exposure mask in the process of forming the sacrificial layer, an upper area of an edge of the positive photosensitive layer that is positioned on the pixel area may be unwantedly exposed due to scattering and diffraction of light. In this case, the upper area of the edge of the positive photosensitive layer that is positioned in the pixel area may be removed in the process of developing the positive photosensitive layer.

Due to this, the thickness of the sacrificial layer in areas corresponding to edges of a pixel area may become thinner than a center of a pixel. That is, the thickness of the edge portion of the sacrificial layer in an area corresponding to a pixel area may become thinner than the thickness of the center portion thereof. As a result, the thickness of the edge portion of the liquid crystal layer formed in the fine space layer that is formed through removal of the sacrificial layer may also become thinner than the height of the center portion. Accordingly, light transmittance on the edge portion of the liquid crystal layer may be decreased.

Accordingly, one subject to be solved by the inventive concept is to provide a liquid crystal display which can improve the light transmittance through making the thickness of the liquid crystal layer uniform and a method for fabricating the same.

Additional advantages, subjects, and features of the inventive concept will be set forth in part in the description which follows and in part will become apparent to those having ordinary skill in the art upon examination of the following or may be learned from practice of the inventive concept.

In one aspect of the inventive concept, there is provided a liquid crystal display comprising: a substrate having a plurality of pixel areas; a first electrode formed on the substrate in an area corresponding to a pixel area; a fine space layers disposed on the first electrode; a partition formed between adjacent fine space layers to partition the plurality of pixel areas; a roof layer formed on the fine space layer and the partition to define the fine space layer; and a second electrode formed on a bottom surface of the roof layer, wherein the second electrode comes in contact with an upper surface of the partition.

A height of the fine space layer may be equal to a height of the partition.

The partition and the roof layer may be formed of different materials.

The partition may be a photosensitive layer including a photo initiator.

The partition may be a negative photosensitive layer.

The liquid crystal display may further comprise a first protection layer formed between the substrate and the first electrode, wherein a lower surface of the partition may come in contact with the first protection layer.

The liquid crystal display may further comprise a data line extending in a second direction that is perpendicular to the first direction on the substrate, wherein the partition may overlap the data line on the data line.

The partition may not extend along a direction in which a gate line extends.

The second electrode is formed along a contour of the partition.

In another aspect of the inventive concept, there is provided a method for fabricating a liquid crystal display comprising: for forming a first electrode in an area corresponding to a pixel area on a substrate having a plurality of pixel areas; forming a partition material layer on the whole substrate to cover the first electrode; forming a second electrode and a roof layer on the partition material layer; forming a liquid crystal injection port on the roof layer and the second electrode; forming a partition by selectively removing the partition material layer disposed on the pixel electrode through the liquid crystal injection port; and forming a liquid crystal layer through injection of liquid crystal molecules through the liquid crystal injection port.

The partition material layer may be formed of a negative photosensitive material.

The forming the partition material layer may comprise coating the negative photosensitive material on the whole substrate to cover the first electrode, and exposing a portion of the negative photosensitive material that is positioned between the plurality of pixel areas using a first exposure mask.

Removal of the partition material layer may be performed using a developing liquid.

The forming the liquid crystal injection port may comprise forming an etch buffer layer on the roof layer, forming an opening by exposing and developing an area of the etch buffer layer that corresponds to the liquid crystal injection port, and, and forming the liquid crystal injection port in the roof layer and the second electrode by etching an area that corresponds to the opening using the etch buffer layer as a mask.

The etch buffer layer may be a positive photosensitive layer.

Etching of the roof layer and the second electrode may be performed using dry etching.

The forming the first electrode may further comprise forming a first protection layer between the substrate and the first electrode, wherein a lower surface of the partition may come in contact with the first protection layer.

The forming the first electrode may comprise forming a data line that extends in a second direction that is perpendicular to the first direction on the substrate, wherein the partition may be formed in a position that overlaps the data line on the data line.

The partition may not extend along a direction in which a gate line extends.

The second electrode may be formed along a contour of the partition.

According to the embodiments of the inventive concept, at least the following effects can be achieved.

According to the liquid crystal display according to an embodiment of the inventive concept, since the partition material layer that is formed by the negative photosensitive layer is patterned, the fine space layer having a uniform height and the partition having superior solidity can be formed.

According to the liquid crystal display according to an embodiment of the inventive concept, the light transmittance can be improved by forming the liquid crystal layer having the uniform height through the fine space layer having the uniform height, and the resistance against an external force can be improved by the partition having the superior rigidity.

The effects according to the inventive concept are not limited to the contents as exemplified above, but further various effects are included in the description.

BRIEF DESCRIPTION OF THE DRAWINGS

The above and other objects, features and advantages of the inventive concept will be more apparent from the following detailed description taken in conjunction with the accompanying drawings, in which.

DETAILED DESCRIPTION OF THE EMBODIMENTS

Advantages and features of the inventive concept and methods of accomplishing the same may be understood more readily by reference to the following detailed description of preferred embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims.

It will also be understood that when a layer is referred to as being "on" another layer or substrate, it can be directly on the other layer or substrate, or intervening layers may also be present between the layers. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the inventive concept.

Hereinafter, embodiments of the inventive concept will be described with reference to the accompanying drawings.

Figure 1:
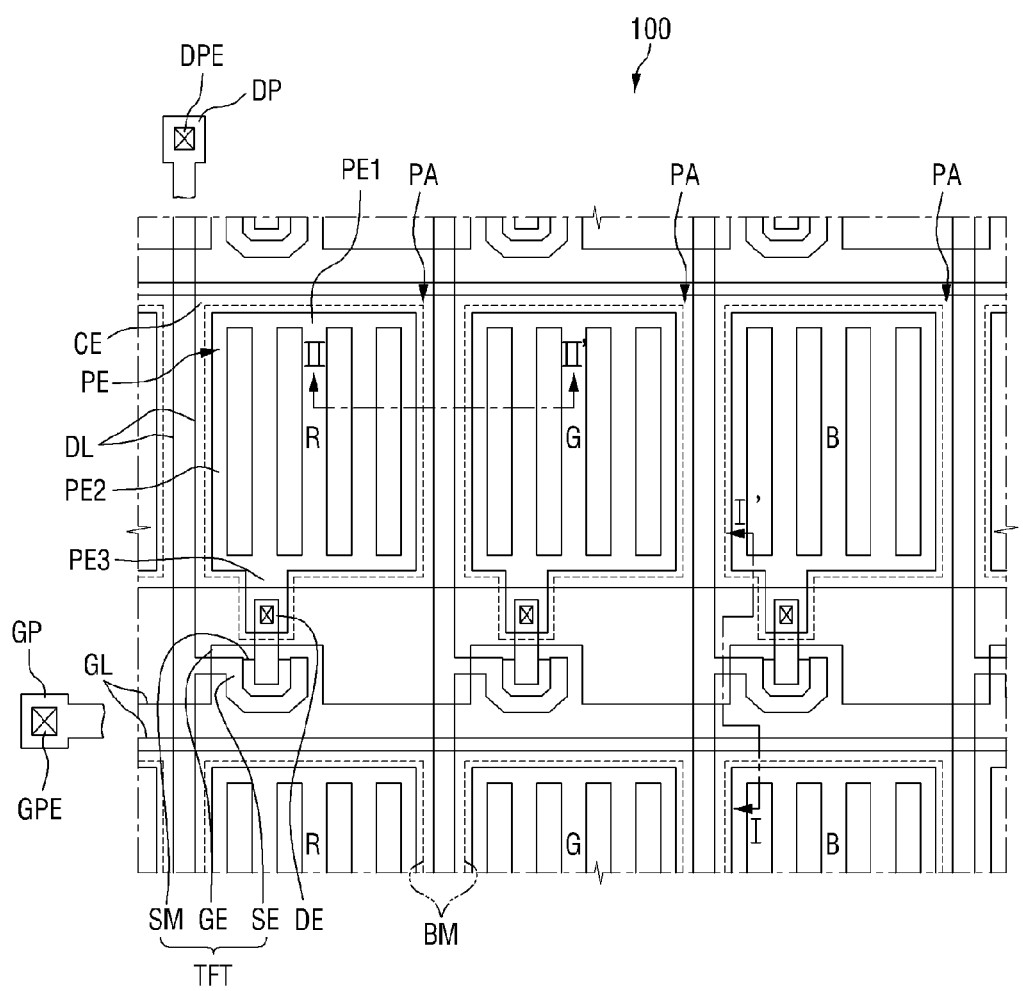
FIG. 1 is a plan view of a liquid crystal display according to an embodiment of the inventive concept.
Figure 2:
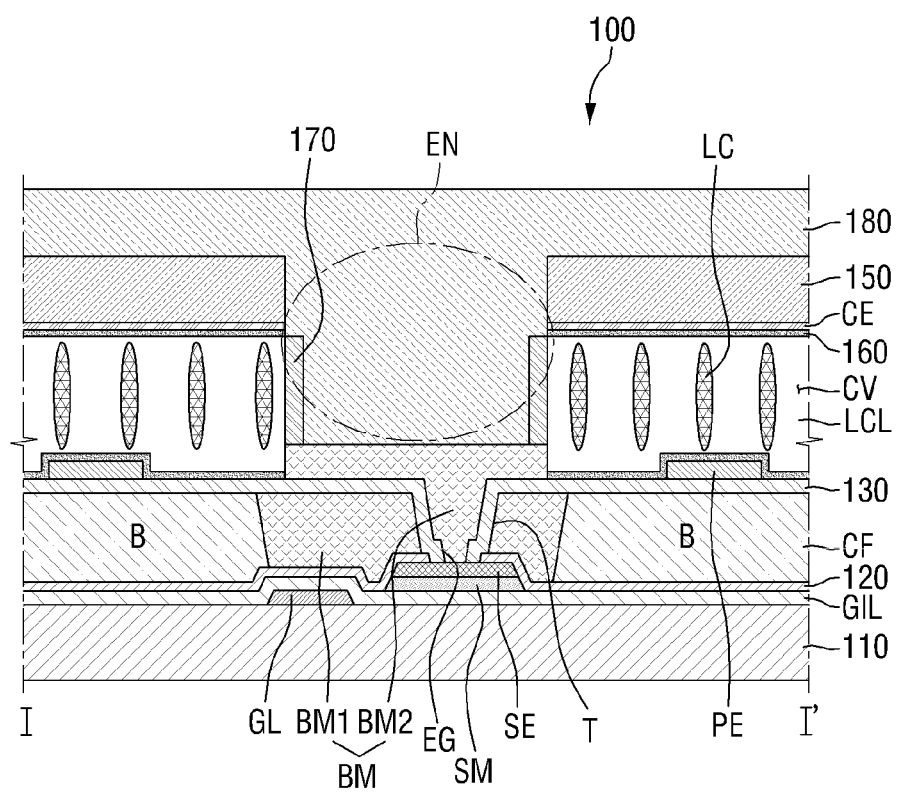
FIG. 2 is a cross-sectional view taken along line I-I' of FIG. 1.

FIG. 1 is a plan view of a liquid crystal display according to an embodiment of the inventive concept. FIG. 2 is a cross-sectional view taken along line I-I' of FIG. 1, and FIG. 3 is a cross-sectional view taken along line II-II' of FIG. 1.

Figure 3:
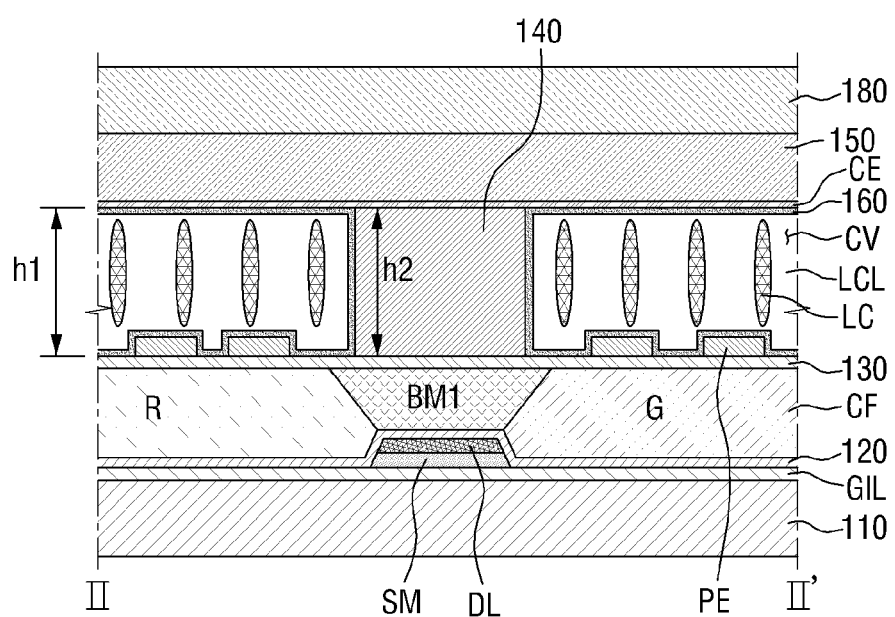
FIG. 3 is a cross-sectional view taken along line II-II' of FIG. 1.

Referring to FIGS. 1 to 3, a liquid crystal display 100 may include a substrate 110, a gate line GL, a data line DL, a gate insulating layer GIL, a thin film transistor TFT, an insulating layer 120, color filters CF, a first light interception pattern BM1, a first protection layer 130, a pixel electrode PE, a second light interception pattern BM2, a fine space layer CV, a partition 140, a roof layer 150, a common electrode (also referred to as a "second electrode") CE, an alignment layer 160, a liquid crystal layer LCL, a sealing layer 170, and a capping layer 180.

The substrate 110 may be a transparent insulating substrate, and may have a plurality of pixel areas PA.

The gate line GL is formed on the substrate 110 to extend in a first direction, and transfers a gate signal. A gate pad GP is connected to one end of the gate line GL. A gate pad electrode GPE may be formed on the gate pad GP. The gate pad electrode GPE is a contact electrode that connects an external wiring for applying a signal to the pixel electrode PE.

The data line DL is formed on the substrate 110 to extend in a second direction that crosses the first direction, is isolated from the gate line GL, and transfers a data signal. A data pad DP is connected to one end of the data line DL. A data pad electrode DPE may be formed on the data pad DP. The data pad electrode DPE is another contact electrode that connects an external wiring for applying a signal to the pixel electrode PE.

The gate insulating layer GIL covers the gate line GL formed on the surface of the substrate 110 and the gate pad GP, and is formed of an insulating material. For example, the gate insulating layer GIL may include silicon nitride or silicon oxide. On the other hand, the data line DL and the data pad DP may be formed on the gate insulting layer GIL.

The thin film transistor TFT includes a gate electrode GE, a semiconductor layer SM, a source electrode SE, and a drain electrode DE.

The gate electrode GE may be formed to project from the gate line GL toward the semiconductor layer SM in a section viewed from the top. The gate electrode GE may include any one of indium tin oxide (ITO), indium zinc oxide (IZO), and indium tin zinc oxide (ITZO). Further, the gate electrode GE may have a two-layer structure including a first electrode layer made of the above-described material and a second electrode layer made of a material to be described later. The second electrode layer may be made of a metal, such as copper (Cu), molybdenum (Mo), aluminum (Al), tungsten (W), chrome (Cr), or titanium (Ti), or an alloy including at least one of the above-described metals.

The semiconductor layer SM is formed on the gate electrode GE with an intervening gate insulating layer GIL. The semiconductor layer SM may include an active layer provided on the gate insulating layer GIL and an ohmic contact layer provided on the active layer. On the other hand, the semiconductor layer SM may be formed between the data line DL and the gate insulating layer GIL. Further, the semiconductor layer SM may also be formed between the data pad DP and the gate insulating layer GIL.

The source electrode SE is formed to project from the data line DL, and overlaps at least a part of the gate electrode GE in a section viewed from the top. The drain electrode DE is formed to be spaced apart from the source electrode SE, and overlaps at least a part of the gate electrode GE in a section viewed from the top. The source electrode SE and the drain electrode DE may be made of a metal, such as copper, molybdenum, aluminum, tungsten, chrome, or titanium, or an alloy including at least one of the above-described metals. Here, the source electrode SE and the drain electrode DE overlap a part of the semiconductor layer SM in an area other than an area where the source electrode SE and the drain electrode DE are spaced apart from each other.

The insulating layer 120 is formed on the gate insulating layer GIL, and may have through-holes for exposing the drain electrode DE, the gate pad GP, and the data pad DP. The insulating layer 120 may include, for example, silicon nitride or silicon oxide.

The color filters CF are formed on the insulating layer 120 in areas corresponding to the respective pixel areas PA. The color filter CF is to provide a color to light that passes through the liquid crystal layer LCL, and may display one of primary colors. The color filter may include a red filter (R), a green filter (G), and a blue filter (B). However, the color filter CF is not limited to the above-described color filter.

The first light interception pattern BM1 may be formed on the same plane as the layer of the color filters CF on the substrate 110. Specifically, the first light interception pattern BM1 may be arranged at edges of the respective pixel areas PA on the insulating layer 120. That is, the first light interception pattern BM1 may be arranged to surround the color filters CF. The first light interception pattern BM1 is formed of a light interception organic material and intercepts unnecessary light for implementing an image.

The first light interception pattern BM1 may be arranged at the edges of the respective pixel areas PA on the insulating layer 120, and may be formed to have a trench T that exposes at least a part of a signal electrode, for example, the source electrode SE, of the thin film transistor TFT. The trench T of the first light interception pattern BM1 may provide a path through which probes for testing the thin film transistor TFT may contact the source electrode SE of the thin film transistor TFT.

The first protection layer 130 is formed between the substrate 110 and the pixel electrode PE, and specifically, on the color filters CF and the first light interception pattern BM1, to protect the color filters CF and the first light interception pattern BM1. Further, the first protection layer 130 may reduce damage of the color filters CF and the first light interception pattern BM1 due to an $O_2$ ashing process for finally removing the remainders in the fine space layer CV in a process of forming the fine space layer CV into which the liquid crystal molecules LC are injected. The first protection layer 130 may be formed of at least one of SiNx, SiOx, and SiOxNy.

The pixel electrode PE is formed on the substrate 110, and specifically, on the first protection layer 130 in an area corresponding to a pixel area PA, and is connected to the drain electrode DE. The pixel electrode PE includes at least one trunk electrode PE1, a plurality of branch electrodes PE2 formed to project from the trunk electrode PE1, and a connection electrode PE3 connecting the trunk electrode PE1 and the drain electrode DE to each other in a section viewed from the top. The branch electrodes PE2 are spaced apart for a predetermined distance and are separated from each other. The branch electrodes PE2 may be formed to extend in parallel to each other in a predetermined direction. The trunk electrode PE1 and the branch electrodes PE2 are not limited to the arrangement as illustrated in FIG. 1, but may have various arrangements. The pixel electrode PE may be formed of a transparent conductive material, for example, indium tin oxide (ITO) or indium zinc oxide (IZO).

The second light interception pattern BM2 is formed on the first protection layer 130 to fill in the trench T of the first light interception pattern BM1, and covers the source electrode SE of the thin film transistor TFT. The second light interception pattern BM2 may serve to seal the source electrode SE of the thin film transistor TFT after it is tested through the trench T of the first light interception pattern BM1 whether the thin film transistor TFT is in a normal state. Further, like the first light interception pattern BM1, the second light interception pattern BM2 may be formed of a light interception organic material to intercept unnecessary light in the area of the trench T of the first light interception pattern BM1. That is, the second light interception pattern BM2 may form one light interception pattern BM together with the first light interception pattern BM1 to intercept a color mixture that may appear at the edges of the color filters CF.

The fine space layer CV is disposed on the pixel electrode PE. The fine space layer CV may be formed in areas corresponding to pixel areas PA, and may be formed by forming a partition material layer 140b (in FIG. 6). The partition material layer 140b may be formed by forming a partition forming material on an entire surface of the pixel electrode PE and the first protection layer 130 which are formed on the substrate 110 and then removing portions that are positioned in areas corresponding to the pixel areas PA. The partition material layer 140b may be formed of a photosensitive layer that includes a photo initiator, for example, a negative photosensitive layer. In this case, the fine space layer CV is formed by removing a portion of the negative photosensitive layer that is not exposed. Specifically, in the negative photosensitive layer, the area surrounding the pixel area PA is exposed to form the partition 140. The area which is non-exposed pixel area PA of the negative photosensitive layer is removed through a developing process to form the fine space layer CV. The partition 140 does not extend along a direction in which a gate line extends.

Since the fine space layer CV is formed through removal of the negative photosensitive layer in the pixel area PA after the negative photosensitive layer is hardened to form the partition 140, the fine space layer CV may have a uniform height. Accordingly, the liquid crystal layer LCL that is formed through injection of the liquid crystal molecules LC into the fine space layer CV has a uniform height to improve the light transmittance. Further, the width of the light interception pattern BM may be decreased to prevent light leakage that may occur at the edge of the liquid crystal layer LCL due to the non-uniform height of the liquid crystal layer LCL. The fine space layer CV may have a first height h1.

The partition 140 is arranged between the adjacent fine space layers CV to partition a plurality of pixel areas PA on the substrate 110. Specifically, the partition 140 may be formed in a region that overlaps the data line DL on the first protection layer 130. The partition 140 is formed of the remained partition material layer 140b that is not removed when the partition material layer 140b of the pixel area PA is removed to form the fine space layer CV. Since the partition 140 is formed of the exposed and hardened partition material layer 140a, the partition 140 may have superior rigidity. The partition 140 may have a second height h2 that is equal to the first height h1 of the fine space layer CV.

The roof layer 150 is formed on the fine space layer CV and the partition 140. The fine space layer CV may be formed between the substrate 110 and the roof layer 150. The roof layer 150 may be formed of a material that is different from the material of the partition 140, for example, an inorganic material or an organic material. The inorganic material may include, for example, at least one of SiNx, SiOx, and SiOxNy.

The roof layer 150 is formed along the first direction of the substrate 110, and may further include a liquid crystal injection port EN positioned in a portion that overlaps the gate line GL. Specifically, the liquid crystal injection port EN may be formed in an areas corresponding to a transistor forming area in which a thin film transistor TFT is formed. Further, the liquid crystal injection port EN may be formed on one side surface or both side surfaces of the roof layer 150. The liquid crystal injection port EN as described above may enable the alignment material AM and the liquid crystal molecules LC to be injected into the fine space layer CV. The injection of the alignment material AM and the liquid crystal molecules LC may be performed after the partition material layer 140b for forming the fine space layer CV is removed.

The common electrode CE is formed on the bottom surface of the roof layer 150. In this case, the common electrode CE comes in contact with the upper surface of the partition 140. The common electrode CE may be formed of a transparent conductive material, for example, indium tin oxide (ITO) or indium zinc oxide (IZO), and serve to control the alignment direction of the liquid crystal molecules LC by forming an electric field together with the pixel electrode PE. On the other hand, a part of the common electrode CE may be removed to form a part of the liquid crystal injection port EN. The common electrode CE may be formed along a contour of the partition 140.

The alignment layer 160 is formed inside the fine space layer CV, and covers the pixel electrode PE and the common electrode CE. The alignment layer 160 may be formed by injecting an alignment material, such as polyamic acid, polysiloxane, or polyimide, into the fine space layer CV using a capillary force.

The liquid crystal layer LCL may be formed by injecting the liquid crystal molecules LC into the fine space layer CV using the capillary force. The liquid crystal molecules LC may be aligned by the alignment layer 160.

The sealing layer 170 is formed to seal the liquid crystal injection port EN of the fine space layer CV. The sealing layer 170 may be formed of a sealing material that does not react on the liquid crystal molecules LC injected into the fine space layer CV.

The capping layer 180 may be formed on the roof layer 150 and planarize and protect other elements positioned on a lower portion of the capping layer 180. The capping layer 180 may be formed of an insulating material. On the other hand, the capping layer 180 may be formed to seal the liquid crystal injection port EN of the fine space layer CV. In this case, the sealing layer 170 may be omitted.

As described above, according to the liquid crystal display 100 according to an embodiment of the inventive concept, the fine space layer CV having the uniform thickness and the partition 140 having the superior rigidity can be formed through patterning of the partition material layer that is formed of the negative photosensitive layer.

According to the liquid crystal display 100 according to an embodiment of the inventive concept, the light transmittance can be improved by forming the liquid crystal layer LCL having the uniform thickness through the fine space layer CV having the uniform height, and the resistance against the external force can be improved by the partition 140 having the superior rigidity.

Next, a method for fabricating a liquid crystal display according to an embodiment of the inventive concept will be described.

FIGS. 4 to 14 are cross-sectional views of processing steps explaining a method for fabricating a liquid crystal display according to an embodiment of the inventive concept.

Figure 4:
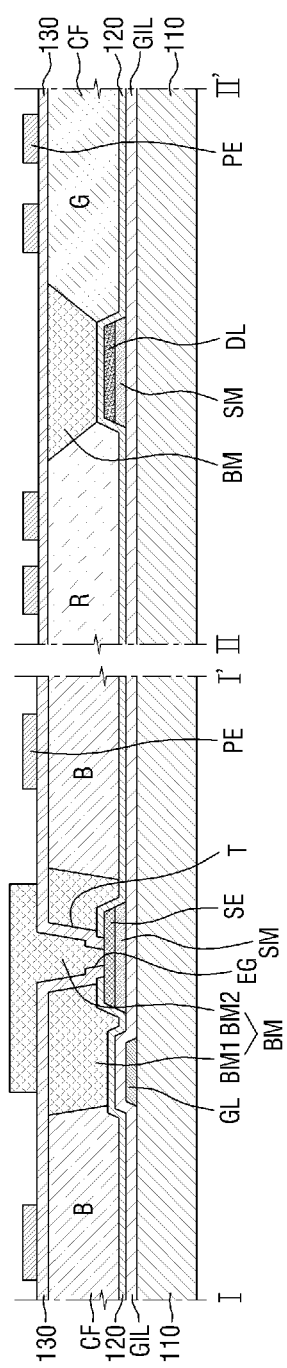
FIGS. 4 to 14 are cross-sectional views of processing steps explaining a method for fabricating a liquid crystal display according to an embodiment of the inventive concept.

First, referring to FIG. 4, pixel electrodes PE are formed on a substrate 110 in areas corresponding to pixel areas PA (in FIG. 1).

Specifically, a conductive layer is formed on the substrate 110 through a sputtering process or the like. The conductive layer formed on the substrate 110 is patterned using a photolithography process to form a gate line GL. At this time, a gate pad GP (in FIG. 1) and a gate electrode GE (in FIG. 1) may be simultaneously formed.

A gate insulating layer GIL is formed on the substrate 110, on which the gate pad GP (in FIG. 1) and the gate electrode GE (in FIG. 1) are formed, through a plasma enhanced chemical vapor deposition (PECVD) process.

A semiconductor material layer and a conductive layer are sequentially laminated on the gate insulating layer GIL, and the patterning of the semiconductor material layer and the conductive layer is performed using a photolithography process to form a data line DL, a source electrode SE connected to the data line DL, a drain electrode DE (in FIG. 1) that is spaced apart from the source electrode SE, and a semiconductor layer SM that is formed under the data line DL, the source electrode SE connected to the data line DL, the drain electrode DE, and in an area corresponding to an area between the source electrode SE and the drain electrode DE (in FIG. 1). At this time, a data pad DP (in FIG. 1) may be simultaneously formed. Here, the gate electrode GE (in FIG. 1), the semiconductor layer SM, the source electrode SE, and the drain electrode DE (in FIG. 1) constitute a thin film transistor TFT (in FIG. 1).

An insulating layer 120 is formed on the gate insulating layer GIL to cover the thin film transistor TFT (in FIG. 1) and the data pad DP (in FIG. 1). The insulating layer 120 is a protection film, and may be formed of silicon nitride or silicon oxide through the PECVD process or the like.

Color filters CF may be formed on positions corresponding to pixel areas PA (in FIG. 1) on the insulating layer 120. The color filters CF may be one of primary color filters such as a red color filter (R), a green color filter (G), and a blue color filter (B), and may be formed by patterning an organic polymer material through a photolithography process or by printing the organic polymer material through an ink jet process.

A first light interception pattern BM1 is formed on the plane as the layer of the color filters CF on the insulating layer 120. The first light interception pattern BM1 may be arranged in positions that correspond to edges of the pixel areas PA (in FIG. 1) on the insulating layer 120, and may be formed on the source electrode SE to have a trench T that exposes a part of the source electrode SE. The first light interception pattern BM1 may be formed by patterning a light interception organic material through a photolithography process.

A first protection layer 130 is formed on the color filters CF and the first light interception pattern BM1 to cover the color filters CF, the first light interception pattern BM1, and the source electrode SE. The first protection layer 130 is formed to have an exposure groove EG that exposes a part of the source electrode SE. The first protection layer 130 may be formed of silicon nitride or silicon oxide.

A pixel electrode PE is formed over the respective color filters CF on the first protection layer 130. That is, the pixel electrode PE is formed over an area that corresponds to the pixel area PA (in FIG. 1) on the first protection layer 130. The pixel electrode PE is connected to a drain electrode DE (in FIG. 1). The pixel electrode PE may be formed by forming a transparent conductive material layer on the first protection layer 130 and patterning the transparent conductive material layer using a photolithography process.

Further, a second light interception pattern BM2 is formed on the trench T of the first light interception pattern BM1 to cover the source electrode SE. The second light interception pattern BM2 may be formed by patterning a light interception organic material through a photolithography process.

Figure 5:
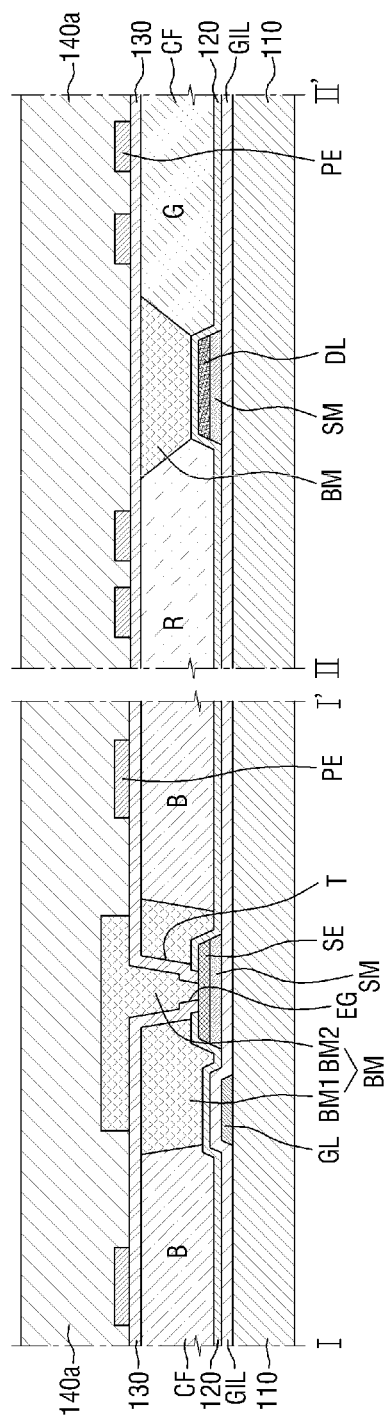
Figure 6:
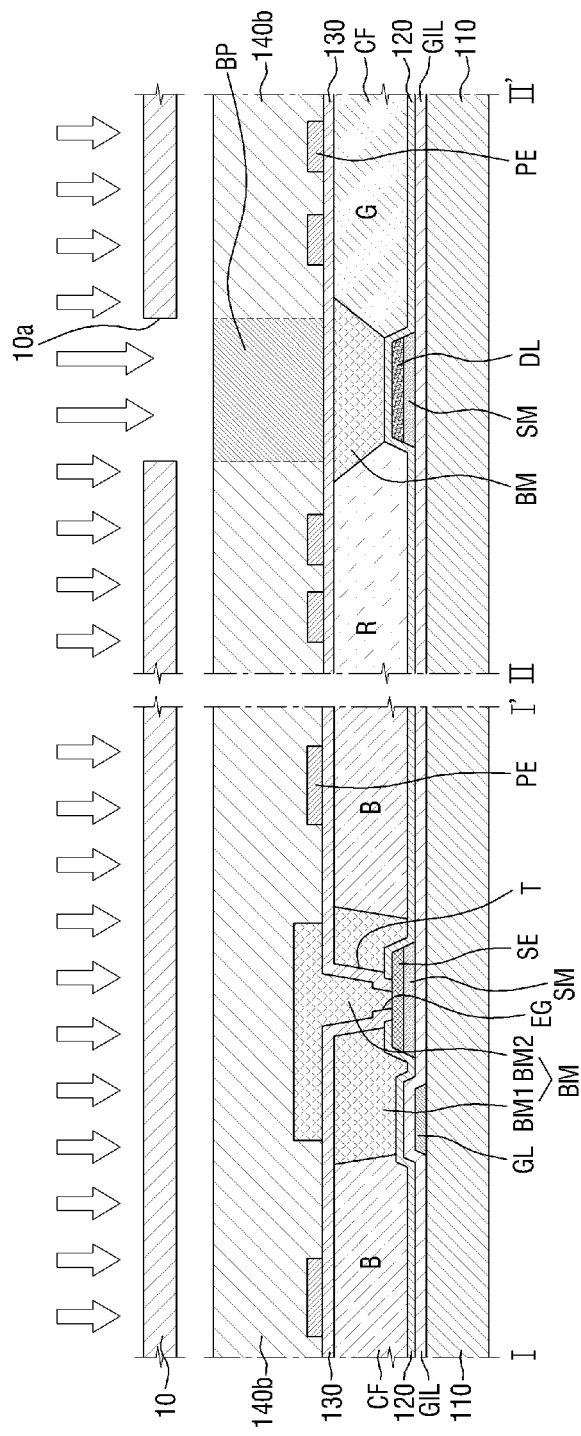

Then, referring to FIGS. 5 and 6, a partition material layer 140b is formed on the entire substrate 110 to cover the pixel electrode PE and the second light interception pattern BM2.

Specifically, as illustrated in FIG. 5, a negative photosensitive material 140a is formed on the entire substrate 110.

As illustrated in FIG. 6, a portion BP that is positioned between a plurality of pixel areas PA (in FIG. 1) of the negative photosensitive material 140a is exposed using a first exposure mask 10. Accordingly, a partition material layer 140b having the portion BP that is hardened by the exposure may be formed. The first exposure mask 10 may have an opening 10a that corresponds to the portion BP of the negative photosensitive material 140a, and the exposure may be performed using light such as UV rays. In FIG. 6, arrows representing irradiation of the light.

Figure 7:
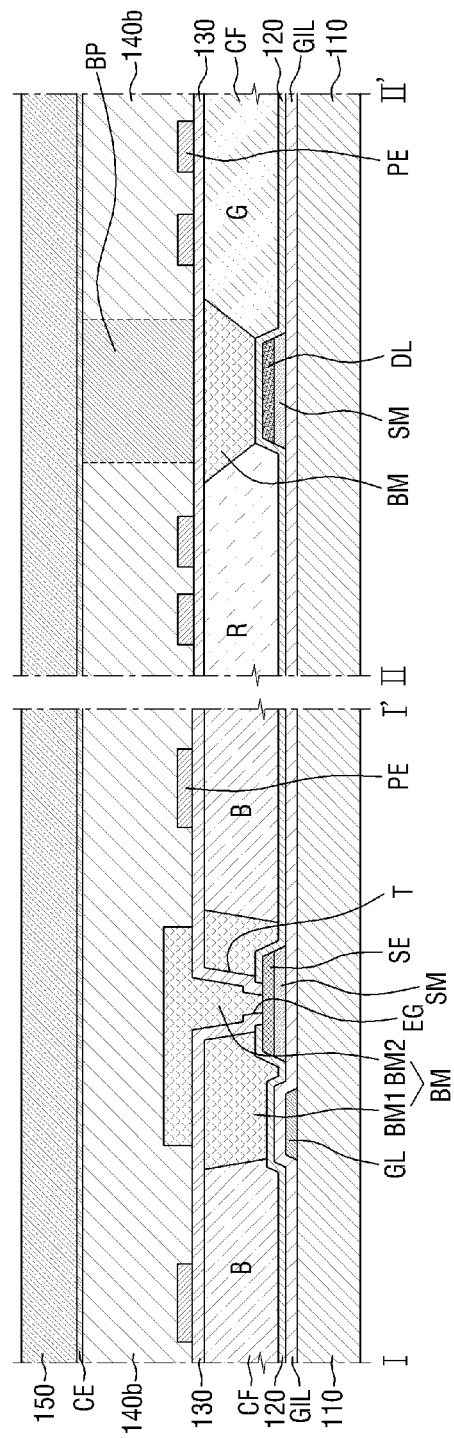

Referring to FIG. 7, a common electrode CE and a roof layer 150 are sequentially formed on the partition material layer 140b. The common electrode may be formed of a transparent conductive material such as ITO and IZO through a sputtering or a deposition processes, and the roof layer 150 may be formed of an inorganic material or an organic material through a deposition or a coating process. The inorganic material may be at least one of SiNx, SiOx, and SiOxNy.

Figure 8:
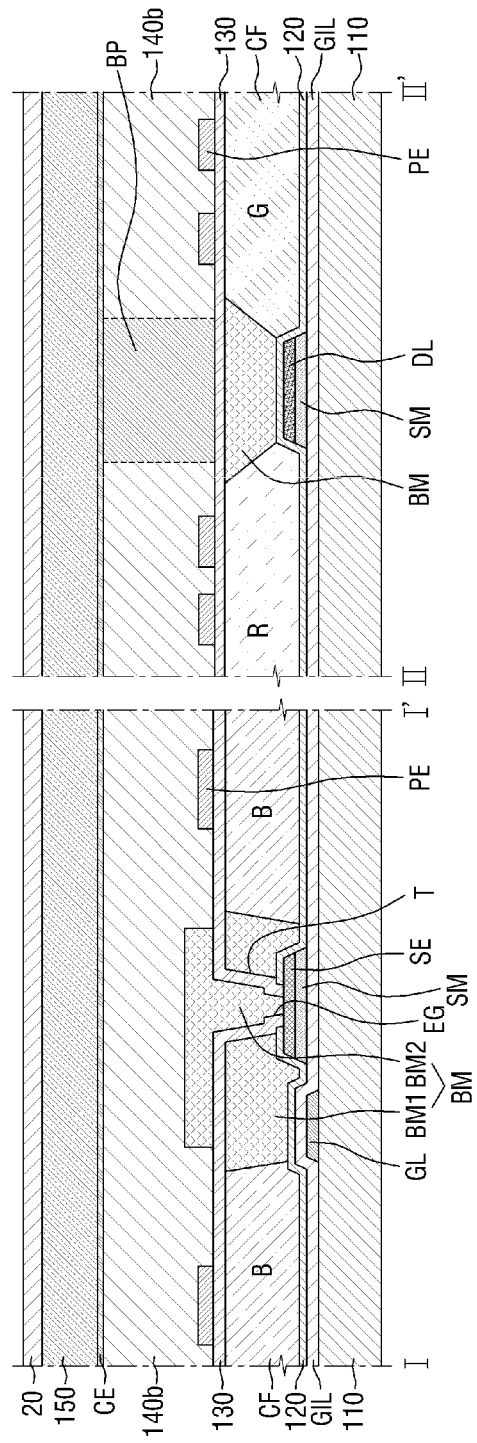
Figure 9:
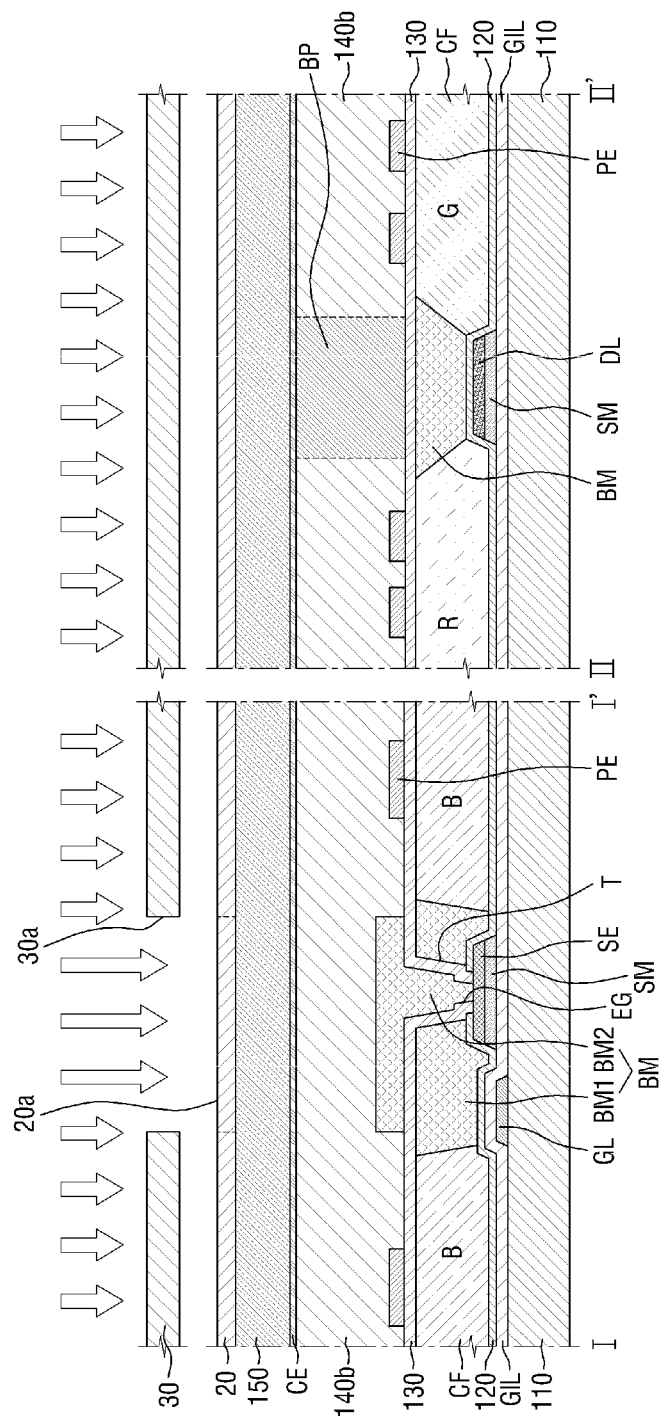
Figure 10:
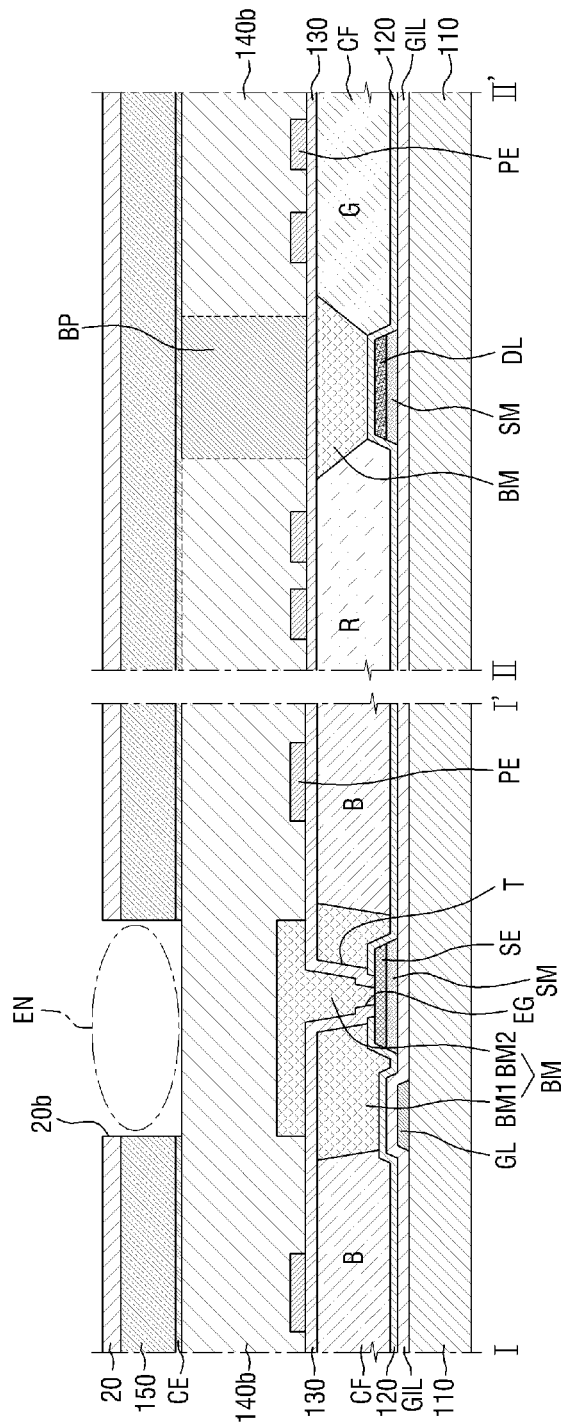

Referring to FIGS. 8 to 10, a liquid crystal injection port EN is formed on the roof layer 150 and the common electrode CE.

Specifically, as illustrated in FIG. 8, an etched buffer layer 20 is formed on the roof layer 150. The etched buffer layer 20 may be a positive photosensitive layer.

As illustrated in FIG. 9, an area 20a that corresponds to the liquid crystal injection port EN (in FIG. 2) of the etched buffer layer 20 is exposed using a second exposure mask 30. The second exposure mask 30 may have an opening 30a that corresponds to the area 20a of the etched buffer layer 20. The exposure may be performed using light such as UV rays. In FIG. 9, arrows represent irradiation of the UV rays.

As illustrated in FIG. 10, the area 20a of the exposed buffer layer 20 is removed through developing of the exposed buffer layer 20 to form an opening 20b. Then, the liquid crystal injection port EN is formed in the roof layer 150 and the common electrode CE by etching the area that corresponds to the opening 20b using the etched buffer layer 20 as an etching mask. The etching of the roof layer 50 and the common electrode CE may be performed by a dry etching. The liquid crystal injection port EN may be positioned on the area that overlaps the TFT.

Figure 11:
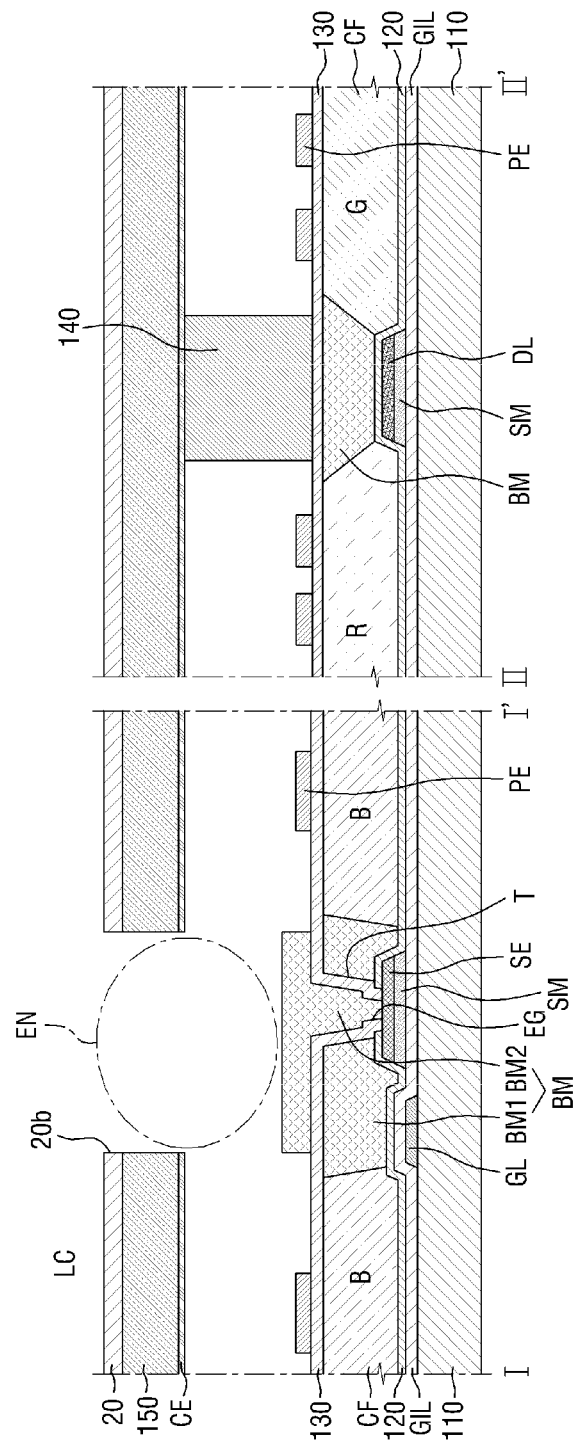

Referring to FIG. 11, a fine space layer CV is formed by removing the partition material layer 140b that is positioned on the pixel electrode PE through the liquid crystal injection port EN, and a partition 140 is formed from the partition material layer BP (in FIG. 5) that remained between the plurality of pixel areas PA (in FIG. 1). In this case, the upper surface of the partition 140 may come in contact with the common electrode CE, and the lower surface of the partition 140 may come in contact with the first protection layer 130. The removal of the partition material layer 140b that is positioned on the pixel electrode PE may be preformed through development using a developing solution and/or ashing process.

Figure 12:
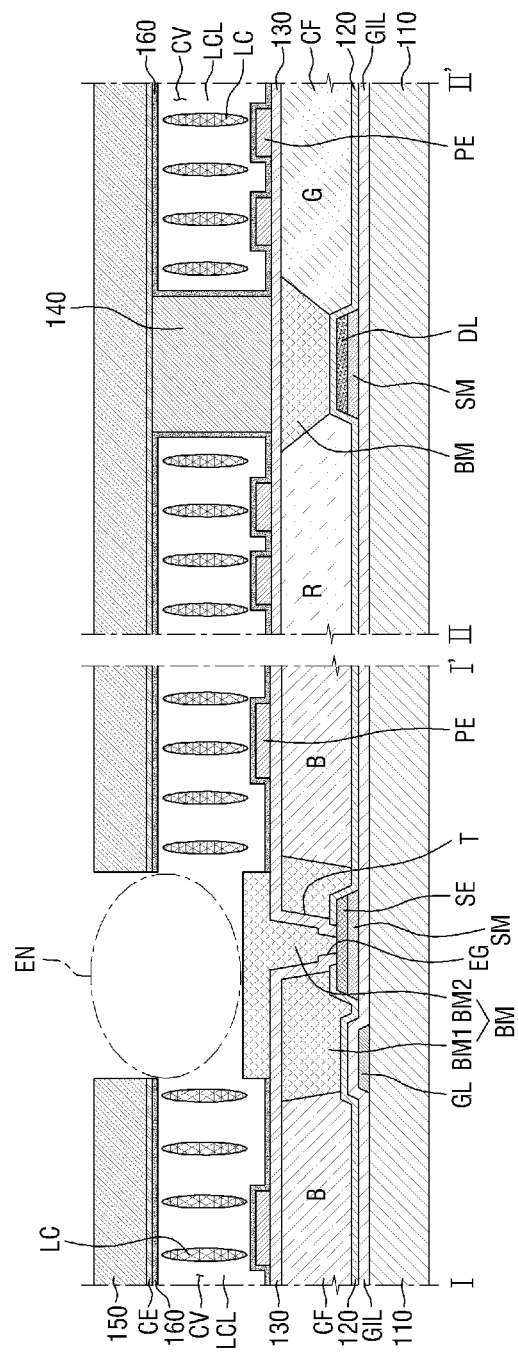

Referring to FIG. 12, an alignment layer 160 and a liquid crystal layer LCL are formed by injecting an alignment material and liquid crystal molecules LC into the fine space layer CV through the liquid crystal injection port EN. The injection of the alignment material and the liquid crystal molecules LC may be performed using a capillary force.

Figure 13:
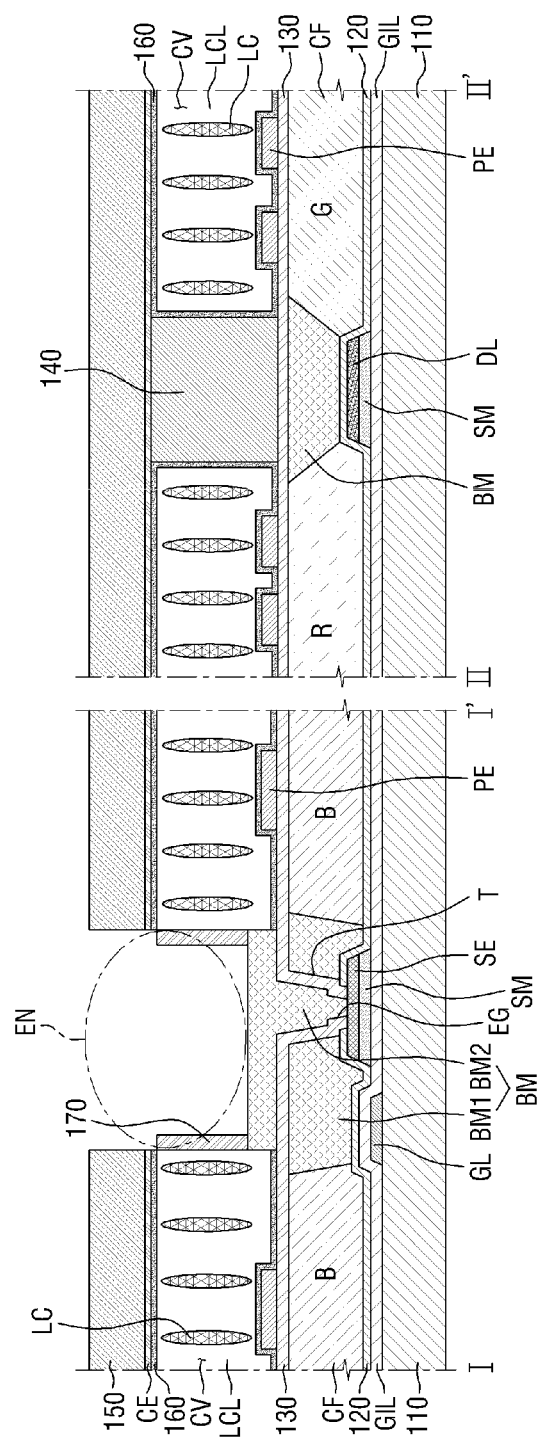

Referring to FIG. 13, a sealing layer 170 that seals the liquid crystal injection port EN of the fine space layer CV is formed after the liquid crystal molecules LC are injected. The sealing layer 170 may be formed of a sealing material that does not react with the liquid crystal molecules LC injected into the fine space layer CV.

Figure 14:
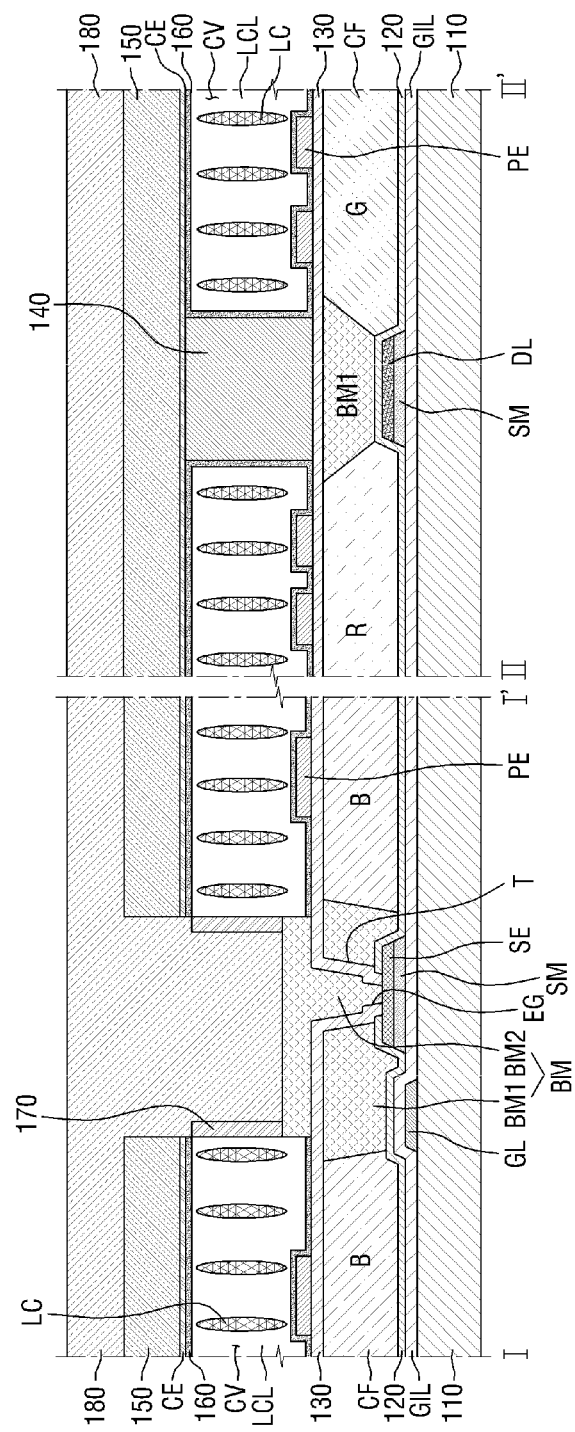

Referring to FIG. 14, a capping layer 180 is formed on the roof layer 150 outside the fine space layer CV. The capping layer 180 may be formed of an insulating material through a coating and/or a deposition method.

As described above, according to the method for fabricating the liquid crystal display 100 according to an embodiment of the inventive concept, since the fine space layer CV is formed by patterning the partition material layer 140b that is formed of the negative photosensitive layer, the process can be simplified as compared with a case where the fine space layer is formed by removing the sacrificial layer that is formed by patterning the positive photosensitive layer. Further, the deterioration of the light transmittance, which is caused by non-uniform thickness of the liquid crystal layer that is formed by injecting the liquid crystal molecules into the fine space layer that is formed through removal of the sacrificial layer having non-uniform thickness, can be prevented.

According to the method for fabricating the liquid crystal display 100 according to an embodiment of the inventive concept, since the partition 140 having the superior rigidity is formed by hardening the partition material layer 140b that is formed of the negative photosensitive layer, the liquid crystal display having high resistance against the external force can be implemented.

Those skilled in the art will appreciate that many variations and modifications can be made to the embodiments without substantially departing from the principles of the inventive concept. Therefore, the disclosed embodiments of the inventive concept are used in a generic and descriptive sense only and not for purposes of limiting the scope of the inventive concept.

What is claimed is:

1. A liquid crystal display comprising:
a substrate having a plurality of pixel areas;
a first electrode disposed on the substrate in an area corresponding to a pixel area;
fine spaces disposed on the first electrode;
a partition disposed between adjacent fine spaces to partition the plurality of pixel areas;
a roof layer disposed on the fine spaces and the partition to define the fine spaces;
a second electrode disposed on a bottom surface of the roof layer; and
an alignment layer disposed inside the fine spaces,
wherein the second electrode comes in contact with an upper surface of the partition,
wherein the alignment layer is seamlessly extending and continuously covers the first electrode, the partition and the second electrode, and
wherein the alignment layer directly contacts an entire side surface of the partition inside the fine spaces and does not contact with the upper surface of the partition.

2. The liquid crystal display of claim 1, wherein a height of each of the fine spaces is equal to a height of the partition.

3. The liquid crystal display of claim 1, wherein the partition and the roof layer are formed of different materials.

4. The liquid crystal display of claim 1, wherein the partition is a photosensitive layer including a photo initiator.

5. The liquid crystal display of claim 4, wherein the partition is a negative photosensitive layer.

6. The liquid crystal display of claim 1, further comprising a first protection layer formed between the substrate and the first electrode,
wherein a lower surface of the partition comes in contact with the first protection layer.

7. The liquid crystal display of claim 1, further comprising a gate line extending in a first direction on the substrate and a data line extending in a second direction that is perpendicular to the first direction on the substrate,
wherein the partition overlaps the data line on the data line.

8. The liquid crystal display of claim 7, wherein the partition does not extend along the first direction.

9. The liquid crystal display of claim 1, wherein the second electrode is formed along a contour of the partition.

10. A method for fabricating a liquid crystal display comprising:
forming a first electrode in an area corresponding to a pixel area on a substrate having a plurality of pixel areas;
forming a partition material layer on the whole substrate to cover the first electrode;
forming a second electrode and a roof layer on the partition material layer;
forming a liquid crystal injection port on the roof layer and the second electrode;
forming a partition by selectively removing the partition material layer disposed on the pixel electrode through the liquid crystal injection port; and
forming a liquid crystal layer through injection of liquid crystal molecules through the liquid crystal injection port.

11. The method of claim 10, wherein the partition material layer is formed of a negative photosensitive material.

12. The method of claim 11, wherein the forming the partition material layer comprises coating the negative photosensitive material on the whole substrate to cover the first electrode, and exposing a portion of the negative photosensitive material that is positioned between the plurality of pixel areas using a first exposure mask.

13. The method of claim 12, wherein removal of the partition material layer is performed using a developing liquid.

14. The method of claim 10, wherein the forming the liquid crystal injection port comprises:
forming an etch buffer layer on the roof layer,
forming an opening by exposing and developing an area of the etch buffer layer that corresponds to the liquid crystal injection port, and
forming the liquid crystal injection port in the roof layer and the second electrode by etching an area that corresponds to the opening using the etch buffer layer as a mask.

15. The method of claim 14, wherein the etched buffer layer is a positive photosensitive layer.

16. The method of claim 14, wherein etching of the roof layer and the second electrode is performed using dry etching.

17. The method of claim 10, wherein the forming the first electrode further comprises forming a first protection layer between the substrate and the first electrode,
wherein a lower surface of the partition comes in contact with the first protection layer.

18. The method of claim 10, wherein the forming the first electrode comprises forming a gate line extending in a first direction on the substrate, and forming a data line,
wherein the partition is formed in a position that overlaps the data line on the data line.

19. The method of claim 18, wherein the partition does not extend along the first direction.

20. The method of claim 10, wherein the second electrode is formed along a contour of the partition.

* * * * *